United States Patent Office 3,549,751
Patented Dec. 22, 1970

3,549,751
COMPOSITION CONTAINING STREPTONIGRIN AND OXYTETRACYCLINE
Tom J. McBride, Ridgewood, N.J., and Jerome J. Oleson, Pearl River, N.Y., assignors to Chas. Pfizer & Co., Inc., New York, N.Y., a corporation of Delaware
No Drawing. Continuation-in-part of application Ser. No. 455,006, May 11, 1965. This application Aug. 30, 1968, Ser. No. 756,385
Int. Cl. A61k 21/00
U.S. Cl. 424—227                    1 Claim

ABSTRACT OF THE DISCLOSURE

Potentiation of the antiviral activity of antiviral agents such as streptonigrin, amethopterin, 6-mercaptopurine, 9-butyl-6-mercaptopurine and triethylene melamine by administering them in conjunction with a tetracycline antibiotic.

CROSS-REFERENCE TO RELATED APPLICATIONS

This is a continuation-in-part of application Ser. No. 455,006 filed May 11, 1965 and now abandoned.

BACKGROUND OF THE INVENTION

The ability of one chemotherapeutant to potentiate another is not only an unexpected discovery but also a most useful one. It not only offers one the opportunity of using a lesser amount of material to provide similar results but also a product having more desirable characteristics. Hence, the search to find means of potentiating antiviral activity of known antiviral agents is a never-ending one.

SUMMARY OF THE INVENTION

This invention is concerned with the treatment of viral infections and, more particularly, with the improvement of inhibition of viruses of the ribonucleic acid class by means of administering therapeutically-effective compositions of antibiotic substances in conjunction with antiviral agents.

Accordingly, this invention relates to an effective composition for inhibiting virus of the ribonucleic acid class comprising a tetracycline antibiotic, an antiviral agent selected from the group consisting of streptonigrin, amethopterin, 6 - mercaptopurine, 9 - butyl - 6 - mercaptopurine and triethylene melamine and a carrier therefor wherein the ratio of tetracycline antibiotic to antiviral agent is from about 65:35 to about 99.99:0.01 by weight.

It has now been found unexpectedly that certain antibiotics, when administered in conjunction with antiviral agents, effectively enhance the overall antiviral activity. Said antibiotics are specific and restricted to a particular class of antibiotics which may be designated as tetracycline antibiotics. Typical examples of tetracycline antibiotics are: oxytetracycline, tetracycline, chlortetracycline, 6-demethyl - 6 - deoxytetracycline, 6 - demethyl - 6 - deoxy-6 - methylene oxytetracycline, 6 - demethyl - 7 - chlortetracycline and 7-bromotetracycline.

In this connection, it is to be understood that by the use of the term "tetracycline antibiotic" there is meant to be included not only the amphoteric tetracycline compounds, but also such acid addition salts thereof as the hydrochloride, hydrobromide, hydroiodide, sulfate, nitrate, phosphate, maleate, citrate, etc., as well as base salts of same, or any other pharmaceutically acceptable salts of these particular antibiotics which happen to be therapeutically useful per se.

The synergistic effect which results from such combinations can be obtained by the following methods of administration:

(I) Administration of a mixture containing the antibiotic and the antiviral agent.
(II) Simultaneous administration of the antibiotic and the antiviral agent separately.
(III) Initial administration of antibiotic followed by administration of antiviral agent.

On a comparative basis, all three methods are equally effective; however, on a practical basis and for convenience, the procedure of (1) is preferred. With regard to procedure (III), it is, of course, obvious that the administration of antiviral agent must be accomplished within a certain time period once the antibiotic has been administered. This time period is dependent on the fact that said antibiotic must be available in the blood stream to allow reaction with the antiviral agent. Although this time period may vary with individual antibiotic, a general maximum time period for all antibiotics will be approximately 2 hours. That is, once the antibiotic has been administered, the antiviral agent must be administered within a 2 hour period.

In accordance with the present invention, equivalent or superior antiviral activity can be obtained with the aforementioned combinations containing as little as one-tenth of the similarly effective antiviral agent dosage required when said agent is used alone. For example, a combination of oxytetracycline hydrochloride and streptonigrin providing a dose of 90 mg./kg./day and 0.12 mg./kg./day with regard to oxytetracycline hydrochloride and streptonigrin, respectively, shows a 50% increase in antiviral activity when compared to the antiviral activity produced by streptonigrin alone at a dose of 0.4 mg./kg./day.

It is to be understood that the term "combination" as used throughout this disclosure is not restricted to physical mixtures alone. It is meant to signify the sum total dose of antibiotic and antiviral agent regardless of whether they are administered individually or as a physical mixture.

An example of a virus of the ribonucleic acid (RNA) class is the Rauscher mouse leukemia virus described in the Journal of the National Cancer Institute, volume 29, pages 515–43 (1962). Naturally occurring in mice, the Rauscher virus disease is characterized by early viremia, splenomegaly and erythrocytopoesis followed by lymphocytic leukemia. This disease must be distinguished from other lymphoid leukemias, including those transmitted by leukemia cells but apparently not by an active virus.

The Rauscher mouse leukemia has been established to be a ribonucleic acid virus. Other viruses associated with the transmission of animal tumors include the Moloney mouse virus, the Gross virus, the Rich virus and the Rouse sarcoma virus.

The novel compositions of this invention also find application in the treatment of other viruses of the RNA class such as avian leukosis (Twiehaus varus).

With regard to dosage levels for administering the combinations described herein, it has been found that a daily dose of from about 50 to about 200 mg. per kilogram body weight is a desirable range wherein said antibiotic provides at least about 65% by weight of the total dose. However, it is preferred to have a combination in which said antibiotic provides at least about 90% by weight of the total dose. Even more preferred is a combination in which said antibiotic is in a sufficient amount to provide at least about 99% by weight of the total dose. Of course, the weight of the entire mixture must be within the aforementioned dosage limits. For instance, a suitable upper limit of the aforementioned dosage range might consist of 180 mg./kg. of antibiotic and 0.04 mg./kg. of antiviral agent. Similarly, a suitable lower limit might consist of 50 mg./kg. of antibiotic and 0.32 mg./ kg. of antiviral agent. In general, although exceptions exist, a universal minimal antibiotic dosage of approximately 50 mg./kg. must be present in order to enhance the activity of any level of antiviral agent.

The standards used to compare the many possible combinations within the limits described above are: antiviral agent at a dose of 0.4 mg./kg. and antibiotic at a dose of about 180 mg./kg. It should be understood, however, that these limits will be dependent upon the particular antibiotic utilized. For example, for tetracycline the upper limit is about 200 mg./kg. whereas for 6-demethyl-6-deoxytetracycline the upper limit is between 75 and 100.

When such comparisons were made, it was observed that a strikingly effective combination consisted of 90 mg./kg. of antibiotic and 0.12 mg./kg. of antiviral agent. Even more surprising, however, was the result derived from a combination containing 120 mg./kg. of antibiotic and 0.06 mg./kg. of antiviral agent. For example, when the above two dose levels were tested using an oxytetracycline hydrochloride-streptonigrin combination the antiviral activity was enhanced approximately 50% in comparison to a streptonigrin standard, i.e., a dose of 0.4 mg./kg.

The unusual behavior described above is highlighted by the fact that only a very small amount of antiviral agent is required to provide the substantial increase in antiviral activity.

The synergistic effect provided by the antibiotics disclosed herein is not found to be universally true for all antibiotics. For instance, similar combinations of antiviral agents with chloramphenicol, erythromycin, oleandomycin, carbomycin, and penicillin G did not potentiate the antiviral activity of the antiviral agent where the response noted essentially reflected the activity of the antiviral agent.

The enhanced antiviral activity of the combinations disclosed in the instant invention is demonstrated in vivo by direct bioassay of the virus level in the plasma of control and treated animals. Recipient animals are inoculated with the pooled plasma under test and, after 21 days, these latter animals are sacrificed and the speen weights recorded.

For administration purposes, a non-toxic carrier is, of course, selected, i.e., one which is free of significant adverse effect at the level of ordinary use. Such carriers include various liquids and solids, including water, aqueous ethanol, isotonic saline or glucose, starch, lactose, calcium phosphate and feedstuffs.

The amount of carrier utilized in a particular composition depends on the mode of administration and the nature of the diluent.

With regard to modes of administration, either oral or parenteral administration may be employed; however, the parenteral route, including intravenous inoculation, is perhaps preferable.

Example I

BALB/c mice approximately 5 weeks old are inoculated intraperitoneally with 0.2 ml. of a $10^{-1}$ dilution of Rauscher virus pool No. 6001–5 and are randomized into "donor" drug treated and control groups containing six mice per group. The antibiotic-antiviral agent combinations disclosed herein are administered in the indicated dosages by intraperitoneal injection (1 ml. volume), commencing on day 5 and continuing daily to day 8. On day 9 the donor mice are sacrificed and survival rates and spleen weights are recorded. These sacrificed animals are bled from the brachial artery and the plasma pooled in each group. The resulting plasma is inoculated intraperitoneally (0.2 ml. volumes) into groups of "recipient" mice (six mice per group) for assay. At 21 days postinoculation these mice are sacrificed and the spleens weighed individually. Because the spleen weight of mice following infection with this virus is known to be directly related to dose of virus, the degree of splenomegaly observed in recipient mice is used as a measure of the degree of viremia in the drug treated and control donor groups. The antiviral effect or the T/C value is a measure of the difference between the mean spleen weight of the treated group and the mean spleen weight of the control group.

Results are shown below of the effects of four antibiotics on mice infected with Rauscher virus in accordance with the procedure described above:

| Treatment | Dosage, mg./kg. | Donor, survival ratio | Recipient antiviral effect, T/C |
|---|---|---|---|
| Oxytetracycline HCl | 100 | 18/18 | 72 |
| Tetracycline HCl | 100 | 6/6 | 95 |
| Chlortetracycline HCl | 100 | 6/6 | 115 |
| 6-demethyl-6-deoxytetracycline HCl | 75 | 17/18 | 84 |

Similarly, the effects of antiviral agents cited below are tabulated:

| Treatment | Dosage, mg./kg. | Donor, survival ratio | Recipient antiviral effect, T/C |
|---|---|---|---|
| Streptonigrin | 0.4 | 6/6 | 23 |
| Triethylene melamine | 1.0 | 6/6 | 12 |
| 6-mercaptopurine | 80 | 6/6 | 13 |
| Amethopterin | 2.0 | 6/6 | 20 |
| 9-butyl-6-mercaptopurine | 50 | 6/6 | 31 |

The above values are to be used as reference points for comparison with values obtained from antibiotic-antiviral agent combinations in the examples which follow.

Example II

In accordance with the procedure of Example I, the effects of various dosages of exytetracycline HCl (A) and streptonigrin (B) mixtures are shown below:

| Treatment | Dosage, mg./kg. (A/B) | Antiviral effect recipient, T/C |
|---|---|---|
| Oxytetracycline HCl/streptonigrin A/B | 160/0.08 | 11 |
| Do | 120/0.06 | 10 |
| Do | 80/0.04 | 27 |
| Do | 120/0.16 | 9 |
| Do | 90/0.12 | 7 |
| Do | 60/0.08 | 9 |
| Do | 40/0.32 | 11 |
| Do | 180/0.04 | 9 |
| Do | 135/0.03 | 16 |
| Do | 105/0.09 | 6 |
| Do | 70/0.06 | 7 |
| Do | 100/0.2 | 8 |
| Do | 75/0.15 | 7 |

Thus, titration of the viremia present in the plasma specimens by direct bioassay demonstrates that treatment with oxytetracycline HCl-streptonigrin mixtures effected a striking inhibition of virus synthesis in vivo, the degree of splenomegaly in the recipient animals representing an index of the quantity of virus present in the plasma. Similar results are obtained when the aforesaid antibiotic-antiviral agent combinations are administered separately at the same time, and when said antiviral agent is administered one hour after said antibiotic has been administered.

Example III

The experimental procedure of Example I is repeated to determine the antiviral effect of various dosages of mixtures containing oxytetracycline HCl and antiviral agents. The results are shown below:

| Treatment | Dosage, mg./kg. | Donor, survival ratio | Recipient antiviral effect, T/C |
|---|---|---|---|
| Oxytetracycline HCl/triethylene melamine | 100/1.0 | 6/6 | 6 |
| Oxytetracycline HCl/amethopterin | 100/2.0 | 6/6 | 6 |
| Oxytetracycline HCl/9-butyl-6-mercaptopurine | 100/50 | 6/6 | 6 |

Thus, the results indicate the potentiation by oxytetracycline HCl of the antiviral activity of three antiviral agents. Analogously, an oxytetracycline HCl-6-mercaptopurine combination, provides the same antiviral effect as observed with an oxytetracycline HCl-9-butyl-6-mercaptopurine combination. Similar results are obtained when the above cited antibiotic-antiviral agent combinations are administered separately at the same time, and when said antiviral agent is administered one hour after said antibiotic has been administered.

Similar utility can be found with the following antibiotics when used in combination with the aforementioned antiviral agents:

6-demethyltetracycline HCl
6-demethyl-7-bromotetracycline HCl
6-deoxy-5-oxytetracycline HCl
6-deoxytetracycline HCl
7-bromotetracycline HCl
6-demethyl-7-chlortetracycline HCl
6-deoxy-7-chlortetracycline HCl
6-deoxy-6-demethyl-7-chlortetracycline HCl
6-deoxy-7-bromotetracycline HCl
6-deoxy-6-demethyl-7-bromotetracycline HCl Example IV The experimental procedure outlined in Example I is repeated to determine the antiviral effect of various dosages of mixtures containing streptonigrin and antibiotics cited below and the results are tabulated as follows:

| Treatment | Dosage, mg./kg. | Donor, survival ratio | Recipient antiviral effect, T/C |
|---|---|---|---|
| Tetracycline HCl/streptonigrin | 100/0.2 | 6/6 | 10 |
| Chlortetracycline HCl/streptonigrin | 100/0.2 | 6/6 | 10 |
| 6-demethyl-6-deoxy-tetracycline HCl/streptonigrin | 60/0.2 | 6/6 | 10 |
| 6-demethyl-6-deoxy-6-methylene-oxytetracycline HCl/streptonigrin | 100/0.2 | 6/6 | 8 |

These results indicate the potentiation by the above cited antibiotics of the antiviral activity of streptonigrin.

Similar results are obtained when the above cited antibiotic-antiviral agent combinations are administered separately at the same time, and said antiviral agent is administered one hour after said antibiotic has been administered.

Similar utility can be found with the following antibiotics when used in combination with streptonigrin:

6-demethyltetracycline HCl
6-demethyl-7-bromotetracycline HCl
6-deoxy-5-oxytetracycline HCl
6-deoxytetracycline HCl
7-bromotetracycline HCl
6-demethyl-7-chlortetracycline HCl
6-deoxy-7-chlortetracycline HCl
6-deoxy-6-demethyl-7-chlortetracycline HCl
6-deoxy-7-bromotetracycline HCl
6-deoxy-6-demethyl-7-bromotetracycline HCl

What is claimed:

1. An effective composition for inhibiting Rauscher mouse leukemia virus in lower animals comprising per unit dosage between about 60 and 120 mg. per kg. of oxytetracycline with about 0.08 to 0.16 mg. per kg. of streptonigrin.

References Cited

Sugivra (I), Progress in Experimental Tumor Research, vol. 2, 1961, pp. 347, 351 and 355.

Sugivra (II), Cancer Chemotherapy Reports, No. 22, September 1962, p. 41.

Andrewes, Viruses of Vertebrates, Williams and Wilkins Co., Baltimore Md., 1964, p. 178.

Chemical Abstracts 538, 9359b (1959).

JEROME D. GOLDBERG, Primary Examiner

U.S. Cl. X.R.

424—258